USO05136558A

United States Patent [19]
Getreuer et al.

[11] Patent Number: 5,136,558
[45] Date of Patent: Aug. 4, 1992

[54] TWO AXIS ELECTROMAGNETIC ACTUATOR

[75] Inventors: Kurt W. Getreuer, Colorado Springs; Leonardus J. Grassens, Chipita Park; David L. Schell, Colorado Springs, all of Colo.

[73] Assignee: Applied Magnetics Corporation, Goleta, Calif.

[21] Appl. No.: 368,768

[22] Filed: Jun. 20, 1989

[51] Int. Cl.⁵ .............................................. G11B 7/00
[52] U.S. Cl. .............................. 369/44.15; 369/44.16; 369/44.19; 369/44.22; 369/244
[58] Field of Search ............... 369/44.11, 44.15, 44.16, 369/44.17, 44.19, 44.21, 44.22, 247, 248, 251, 258, 244; 350/252, 255, 247

[56] References Cited

U.S. PATENT DOCUMENTS

| | | | |
|---|---|---|---|
| 4,011,003 | 3/1977 | Dragt | 369/44.15 |
| 4,449,213 | 5/1984 | Noborimoto et al. | |
| 4,504,935 | 3/1985 | Jensen | 369/32 |
| 4,514,837 | 4/1985 | Van Rosmalen | 369/219 |
| 4,568,142 | 2/1986 | Iguma | 350/6.3 |
| 4,571,026 | 2/1986 | Maruta | 350/255 |
| 4,596,444 | 6/1986 | Ushida | 350/247 |
| 4,596,448 | 6/1986 | Kikuchi | 350/247 |
| 4,643,522 | 2/1987 | Takashima | 350/255 |
| 4,644,516 | 2/1987 | Musha | 369/43 |
| 4,646,283 | 2/1987 | Ito et al. | |
| 4,669,073 | 5/1987 | Wakabayashi et al. | 369/45 |
| 4,669,823 | 6/1987 | Iguma et al. | 369/44.15 |
| 4,679,904 | 7/1987 | Kurihara | 350/255 |
| 4,702,555 | 10/1987 | Iguma et al. | 350/247 |
| 4,740,946 | 4/1988 | Yumura et al. | 369/219 |
| 4,759,005 | 7/1988 | Kasahara | 369/44.16 |
| 4,763,314 | 8/1988 | McCaslin et al. | 369/249 |
| 4,794,586 | 12/1988 | Korth | 369/215 |
| 4,811,320 | 3/1989 | Kawasaki et al. | 369/45 |
| 4,823,336 | 4/1989 | Inada et al. | 369/215 |
| 4,911,534 | 3/1990 | Beyersbergen van Henegouwen | 369/44.16 |

FOREIGN PATENT DOCUMENTS

| | | |
|---|---|---|
| 57-18037 | 1/1982 | Japan . |
| 58-64649 | 4/1983 | Japan . |
| 60-115031 | 6/1985 | Japan . |
| 60-129937 | 7/1985 | Japan . |
| 61-17230 | 1/1986 | Japan . |
| 61-182642 | 8/1986 | Japan . |
| 61-248241 | 11/1986 | Japan . |
| 62-205540 | 9/1987 | Japan . |

OTHER PUBLICATIONS

G. Boushuid, et al., *Principles of Optical Disc Systems*, Adam Hilger Ltd., Bristol, 1985, pp. 147–153.
Equichi, Naoya, et al., *An 86 mm Magneto-Optical Disk Drive with a compact and fast-seek-time Optical Head*, Optical Data Storage Conference, Vancouver, Mar., 1990.

(List continued on next page.)

*Primary Examiner*—Robert L. Richardson
*Assistant Examiner*—Nabil Hindi
*Attorney, Agent, or Firm*—Knobbe, Martens Olson & Bear

[57] ABSTRACT

An optical disc player/recorder incorporates a laser, and an electromagnetically driven objective lens. The objective lens is mounted to a lensholder which is movable with respect to a base. A single pair of permanent magnets are mounted to the lensholder, and two pair of electromagnetic coils are mounted to the base. The coils and magnets are positioned such that one set of coils is collinear with the direction of magnetization of the permanent magnets and the other set of coils is perpendicular to the direction of magnetization of the magnets. Electromagnetic fields generated by the coils are used to move the objective lens in either a focus direction or a tracking direction. The magnets are mounted on the moveable objective lensholder, while the coils are attached in a heat-sink relationship to the fitted base. The objective lens rests on top of the objective lensholder which is suspended with respect to the base by a pair of flexures. A mirror is provided between the flexures to allow incoming laser light to enter from the side of the optical head, thereby reducing the total overall height of the system. A position sensor may be provided to detect the position of the lensholder, relative to the base of the two axis electromagnetic actuator.

39 Claims, 8 Drawing Sheets

OTHER PUBLICATIONS

Hitachi, Prototype Specification Sheet for a magneto-optical drive.

Kobori, et al., *New Magnetooptic Head with a built-in Generator for a Bias Magnetic Field*, Applied Optics, vol. 27, No. 4, Feb. 15, 1988, pp. 698–702.

Kobori, et al., Optical Data Storage Conference, *Technical Digest Series*, vol. 10, Mar. 11-13, 1987, pp. 186–189.

Sony, Product Brochure, SMO-501 Optical Disk Drive.

Yoshizumi, Keiichi, et al., *Fast Access Actuator for Optical Disk Memory*, SPIE, 1985.

Teruo Murakami, et al., "Magnetooptic Erasable Disk Memory with Two Optical Heads," *Applied Optics*, vol. 25, Nov. 15, 1986, pp. 3986–3989.

I. Sander, "Digital Magneto–Optic Storage System," *Topical Meeting on Optical Data Storage*, Jan. 20, 1983, pp. THA2-1-THA2-4.

M. Hartman, et al., "Erasable Magneto–Optical Recording Media", *IEEE TransActions on Magnetic*, vol. Mag.-20, Sep. 5, 1984, pp. 1013–1018.

TWO AXIS ELECTROMAGNETIC ACTUATOR

BACKGROUND OF THE INVENTION

1. Field of the Invention

The present invention relates generally to the field of optical disc memory systems. More specifically, the present invention relates to a two axis electromagnetic actuator, used for focusing and tracking in optical disc players/recorders.

2. Description of the Related Art

Optical data storage systems that utilize a focused laser beam to record and instantaneously playback information are very attractive in the computer mass storage industry. Such optical data storage systems offer very high data rates with very high storage density and rapid random access to the data stored on the disc. Optical recording and playback in programmable optical disc systems utilize laser light for both recording data on the disc and reading data from the disc. Recording and playback may be accomplished with the same laser source having different light power focused on the surface of the disc for the reading function and recording function, respectively.

In general, servo systems preferably utilize as input a bipolar error signal which carries the sign of the corrective action to be taken. Many methods have been proposed for the generation of radial i.e., tracking, and focus error signals. These error signals are often derived by optical means. A common optical method of generating focus error signals is based on the detection and analysis of a beam of laser light, which is reflected from the data storage plane of the disc.

Most present actuator driving combinations comprise a stationary part and a moving part. These systems generally comprise a coil, a permanent magnet and, in some instances, an iron yoke. These combinations may further be divided into two major groups: first, those having a moving coil and a stationary permanent magnet; and second, those having a moving permanent magnet and a stationary coil.

The moving coil configuration has a number of advantages as well as drawbacks. Besides the problems associated with breakage of the connector leads, which deliver electrical signals and power to the moving coil, the moving component may not make good thermal contact with the environment, owing to the movable suspension. The heat generated in the moving coil thus results in a temperature increase of the moving components which is undesirable if the moving components are adversely affected by elevated temperatures. Further, unless the coils are tightly wound, the dynamic resonance behavior of most moving coil designs tend to cause the moving coils to unwind. However, an advantage of the moving coil system is that the stationary permanent magnet may be made larger, thereby generating and applying a stronger magnetic field.

The opposite argument holds true for a moving permanent magnet combined with a stationary coil. Here, the coils may be made larger than in the moving coil configuration, and can be more tightly wound. This is advantageous in that a larger coil has a larger surface area for cooling. Thus, the heat removal from the coil poses a smaller problem, resulting in a higher permissible current through the coil. However, the maximum attainable magnetic field is decreased, because the maximum permitted size of the permanent magnet is smaller.

In order to attain a precise reading of the information stored on an optical disc, it is necessary to be able to move an objective lens in both a focusing (i.e., up-and-down) direction and a tracking (i.e., side-to-side) direction. Focus and tracking corrections may be affected by moving the objective lens in either the direction of the optical axis for focusing, or in a direction perpendicular to the optical axis for tracking. In some cases, separate magnetic fields are used for focusing and tracking, thus requiring the use of separate magnets, separate coils and separate yokes for each direction. However, the provision of a tracking assembly, separate from the focus assembly increases the size and difficulty of installation of the optical reading apparatus.

Actuators which utilize yokes can be very efficient in terms of acceleration for a given power dissipation. However, because fast access to the data stored on an optical disc requires high acceleration, the total dynamic mass of the actuator should be as low as feasible. The use of yokes made of iron or steel increases the total mass of the optical head, thus making the system response time slower.

Ito, et al., in U.S. Pat. No. 4,646,283 describe a system in which a focus coil is wrapped around an objective lensholder. Two pair of D-shaped tracking coils are bonded to the focus coil on laterally opposed sides of the lensholder. A pair of permanent magnets are secured to respective yokes on base of the actuator, in a manner to provide a magnetic gap between each permanent magnet and its associated yoke. In operation, when electric currents are applied to the coils, the coils produce fields which interact with the magnetic fields of the pair of permanent magnets. This interaction moves the objective lensholder in either the focus or tracking direction, depending upon the applied currents. The levels and polarities of the electric currents applied to the coils are controlled so that the holder is electromagnetically driven by the electromagnetic forces exerted across the magnetic gaps formed between each permanent magnet and its associated yoke. In this way, the motion of the actuator is controlled so that information recorded on the disc may be optically read. However, because the focus coils are wrapped around the lensholder and cover four of its six sides, only one path exists through which light may pass. This is undesirable in that it dictates that the laser light must enter the optical head from the bottom. Such a configuration necessarily increases the total height requirement of the actuator.

SUMMARY OF THE INVENTION

Briefly, the present invention provides a two axis electromagnetic actuator which utilizes two moving permanent magnets and two sets of stationary coils which are mounted on a base. The magnetic fields of the permanent magnets interact with the electromagnetic fields produced by either set of coils, when an electric current is applied to the coils, to move the objective lens in either a focus direction (toward and away from the recording surface) or in a tracking direction (generally normal to the focus direction and normal to the direction of the tracks on the recording surface). Advantageously, the actuator of the present invention does not include a yoke, so that the total mass of the actuator is on the order of a few grams, allowing rapid access to various tracks on the optical disc.

Although moving permanent magnets without yokes are generally less power efficient than the standard actuators discussed above, the allowable power dissipation is higher because the base is capable of heat sinking the coils. This is significant in that a larger current may be conducted through the coils without the detrimental effects of temperature increase. This increase in the maximum allowable current through the coils enables the use of a smaller permanent magnet. Moreover, the use of smaller permanent magnets reduces the mass of the movable portion of the optical head and enables higher acceleration of the objective lens for rapid focus and alignment of the lens with the optical disc.

Significantly, even though smaller permanent magnets are used to reduce the weight of the lensholder, the magnets ar still capable of delivering a magnetic field at the sensitive layer of the optical disc which is adequate for writing and erasing on magneto-optical recording media. Typically, such writing/erasing is accomplished by heating the media surface of the optical disc with a focused laser beam and subsequently cooling it in the presence of an external magnetic field. This process alters the magnetization direction of the heated area in a predictable fashion. Data written to the disc in this manner may be erased by simply reversing the direction of the external magnetic field applied.

In one aspect of the present invention, an objective lens is mounted on one side of a six-sided objective lensholder which is in the general form of a rectangular box. A pair of permanent magnets are secured on laterally opposed sides of the lensholder, thus leaving four vacant faces. This is significant in that the four sides provide possible paths through which light may enter or leave the optical head. Thus, collimated laser light may be introduced from the side of the actuator and directed toward the objective lens by a mirror positioned within the lensholder. This feature was not possible in previous systems, because the coils were wrapped around the lensholder, dictating the need to introduce collimated light to the objective lens from the bottom of the optical head. Preferably, the lensholder is suspended with respect to the base by a pair of flexures, situated above and below the lensholder. The flexures allow movement of the lensholder along two substantially orthogonal directions.

Focus error signals, which are utilized as input to a focus servo circuit, generally operate on the principle that light reflected from the recording surface can be detected and analyzed to determine if the laser spot is in focus on the disc. The servo circuit provides a driving signal which is applied to the focusing coils to affect focusing of the light on the optical disc. Likewise, tracking error signals may be utilized as input to a tracking servo circuit in which a detector may, for example, sense variations in the light intensity over the cross section of the reflected beam. The presence of certain predetermined variations will generate a tracking error signal which will be applied to a tracking servo circuit which in turn provides a driving signal current to the tracking coils to accomplish accurate tracking.

Adjacent each magnet is a tracking coil, secured to the base of the optical head. The tracking coils are positioned such that their center axes are substantially collinear with the direction of magnetization of the permanent magnets. The tracking coils are adapted for connection to a source of electrical current. When such a current is applied to the tracking coils, an electromagnetic field is created which interacts with the magnetic field of the permanent magnets to move the lensholder in a side-to-side i.e., tracking manner with respect to the tracking direction.

Similarly, focus coils are provided both above and below the lensholder, and are secured to the base of the optical head. The focus coils are positioned such that their center axes are substantially perpendicular to the direction of magnetization of the permanent magnets. When an electrical current is applied to the focus coils, an electromagnetic field is created which interacts with the magnetization of the permanent magnets thus moving the lensholder in the focus direction, i.e., toward or away from the recording media, depending upon the direction of the current flow in the coils.

In another aspect of the present invention, the objective lensholder and permanent magnets are rotated 90° about the focal axis, relative to the previous embodiment. In this embodiment, focusing is accomplished in the same way as in the above-described embodiment. However, the tracking coils are offset from the centers of magnetization of the permanent magnets. Thus, when the tracking coils are energized, the fields of the permanent magnets will interact with the fields of the coils, thereby moving the objective lensholder in a side-to-side (i.e., tracking) direction. The degree of movement, as well as the direction is dependent upon the magnitude and direction of the current applied to the tracking coils.

In yet another aspect of the present invention, a position detector is mounted on one side of the base, intermediate the pair of tracking coils. A light emitting diode (LED) is positioned at the opposite side of the base. The LED emits substantially collimated light through a first circular aperture, situated on one side of the lensholder, through a second, smaller circular aperture, situated on the opposite side of the lensholder, and onto the detector. Preferably, the detector is either a quad diode or a two-way position sensitive detector, and will detect movement of the objective lensholder with respect to the base in both the focus and tracking directions.

Further objects, features and other advantages of the present invention will become apparent from the ensuing detailed description, when considered together with the appended drawings.

DETAILED DESCRIPTION OF THE PREFERRED EMBODIMENT

Figure 1:
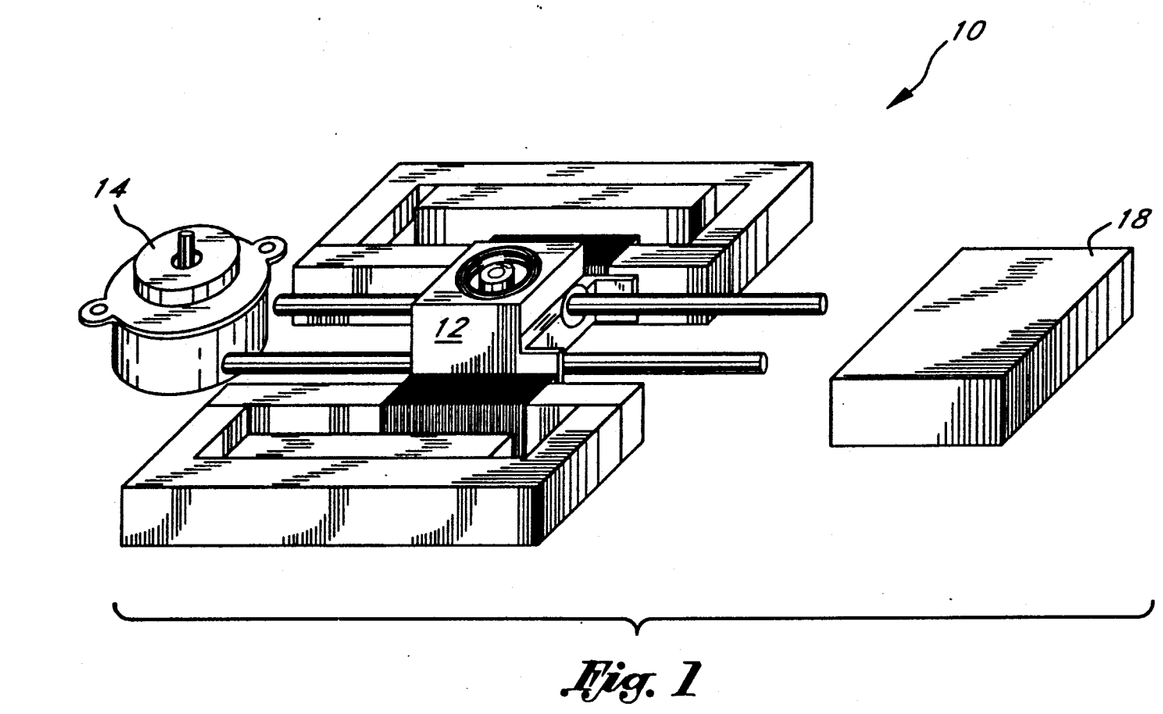
FIG. 1 is a schematic diagram of a typical optical disc memory system into which the two axis electromagnetic actuator of the present invention may be incorporated.

Referring now to the drawings in detail, wherein like reference numerals designate like elements throughout the several views thereof, there is shown generally at 10 in FIG. 1, a schematic diagram of an optical disc memory system, into which a two axis electromagnetic actuator 12, consistent with the present invention, may be incorporated. This arrangement consists of a spindle motor 14 for rotating an optical disc (not shown), a source of laser light, an actuator 12 for positioning an objective lens with respect to the disc, and a stationary optics module 18. The optics module 18 processes the information reflected from the optical disc, and outputs that information to a playback signal processing unit (not shown).

Figure 2:
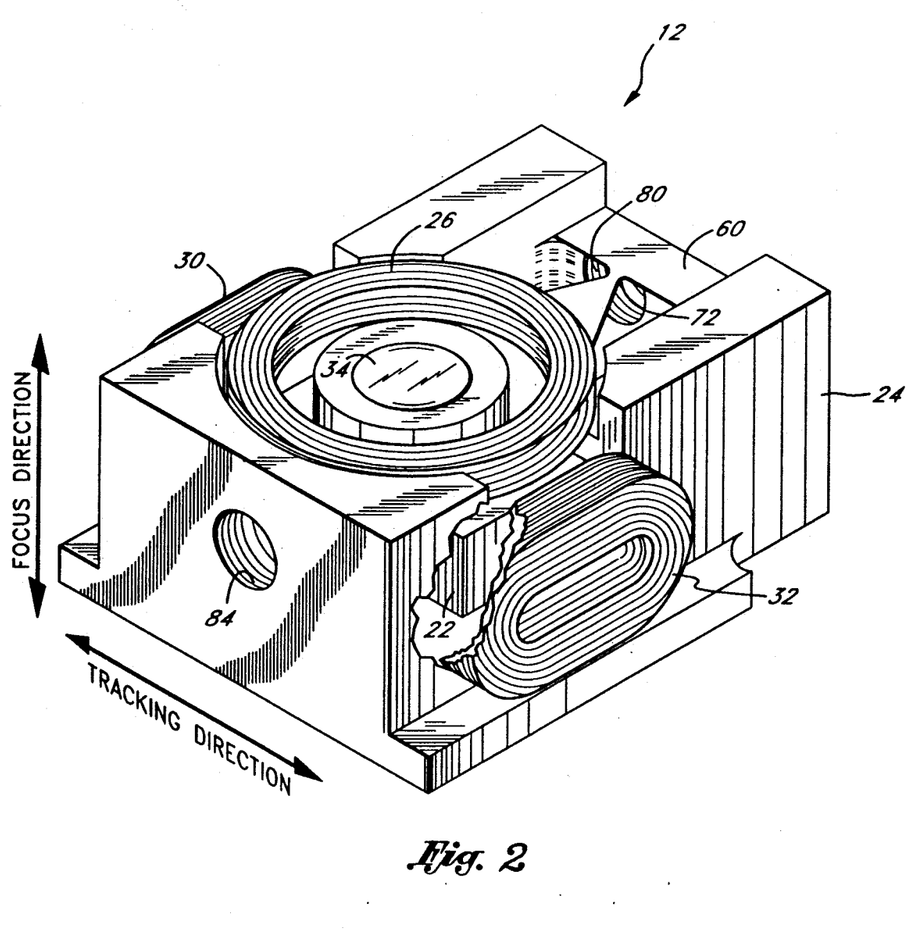
FIG. 2 is an isometric view of a preferred embodiment of the two axis electromagnetic actuator of the present invention.
Figure 3:
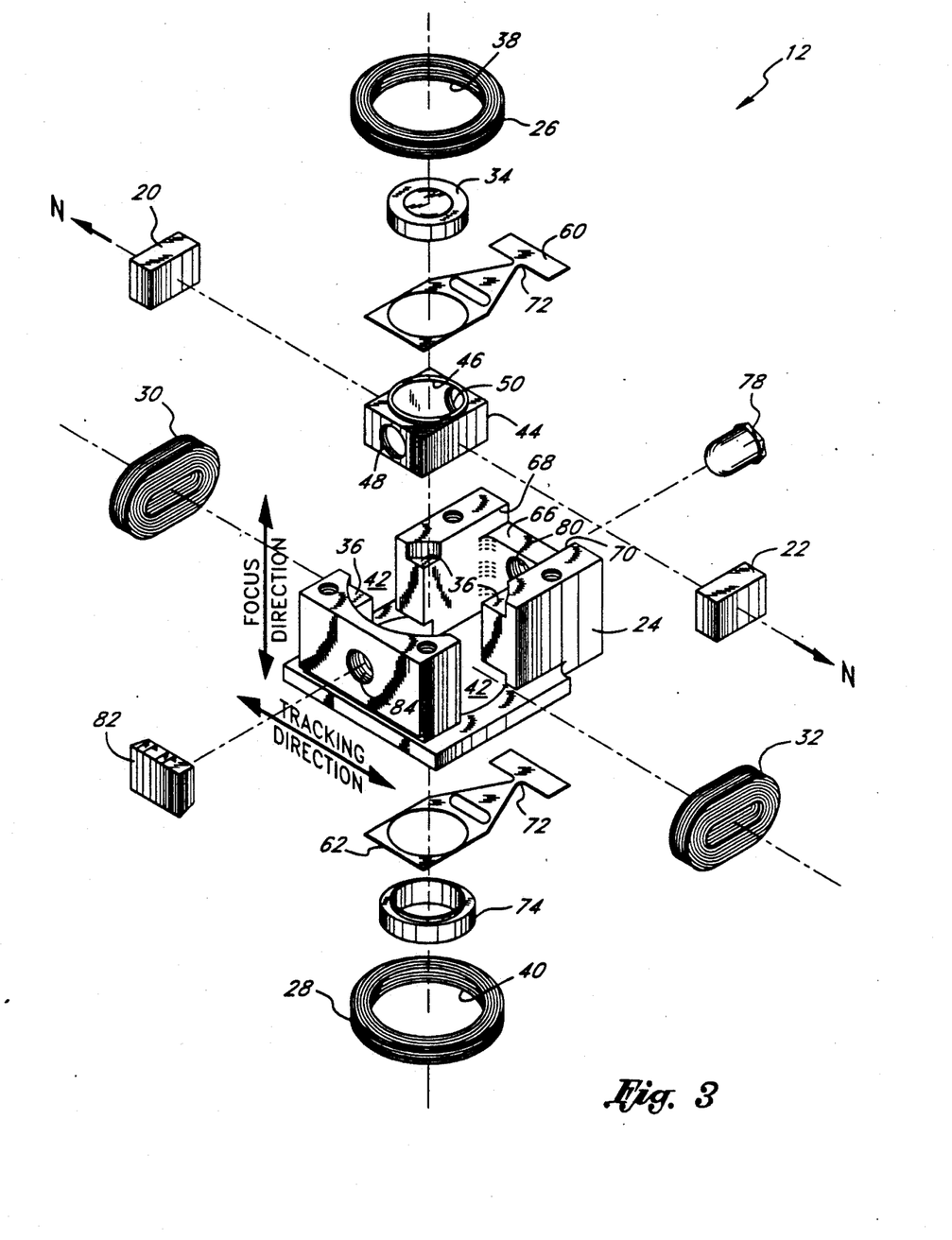
FIG. 3 is an exploded perspective view of the two axis electromagnetic actuator illustrated in FIG. 2.

As more clearly illustrated in FIGS. 2 and 3, the actuator 12, in one embodiment of the present invention, utilizes two permanent magnets 20, 22 and two sets of stationary coils mounted on a base 24. As illustrated in the drawing figures, a first set of round coils 26, 28 are used as focus coils, while a second set of oval coils 30, 32 are used as tracking coils. It is noteworthy, however, that the coils may take on any number of shapes, including, but not limited to circular, oval, rectangular or square. The coils produce electromagnetic fields which interact with the magnetic fields of the permanent magnets 20, 22 to move an objective lens 34 in either a vertical direction (as viewed in FIG. 2) for focusing, or a horizontal direction for tracking.

Preferably, the focus coils 26, 28 are adhesively secured to a plurality of lands 36, disposed at intervals spaced about the base 24. The central apertures 38, 40 of the focus coils 26, 28 are in approximate alignment with the optical axis of objective lens 34, leaving a path through the focus coils 26, 28 through which laser light may travel. In addition, it is noteworthy that the contact made between the focus coils 26, 28 and the lands 36 of the base 24 can serve as a heat sink for the coils 26, 28 so as to increase the maximum allowable power dissipation of the coils. Preferably, the base 24 includes a pair of openings 42 on laterally opposed sides which the tracking coils 30, 32 are adapted to straddle. Like the focus coils 26, 28, the tracking coils 30, 32 are also adhesively secured to the base 24 which serves as a heat sink for the tracking coils 30, 32 as well.

Figure 4:
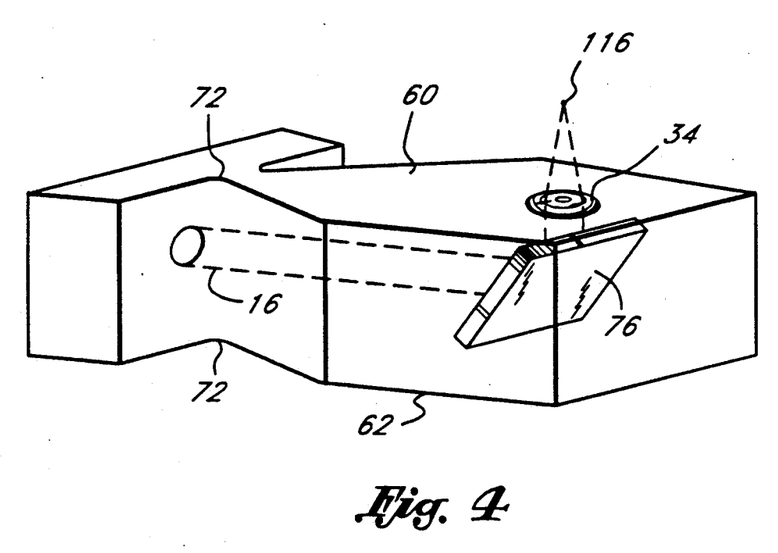
FIG. 4 is a schematic view, illustrating the ability to couple a laser, beam with a mirror between the flexures.

In a preferred embodiment, the magnets 20, 22 are secured on opposite sides of an objective lensholder 44. Preferably, as illustrated in FIG. 3, the magnets 20, 22 are situated such that the north poles of the magnets face away from the lensholder 44. The objective lensholder 44 comprises a six-sided rectangular hollow box, having a circular opening 46 at the top for receiving the objective lens 34, and a pair of smaller openings 48, 50 disposed on laterally opposed sides, intermediate the sides to which the magnets 20, 22 are secured. Preferably, the bottom portion (not shown) of the lensholder 44 is left open to both reduce the weight of the moving objective lensholder 44, as well as to provide an opening through which a mirror 76 (as illustrated in FIG. 4) may be inserted. Significantly, this arrangement leaves four vacant faces, providing alternative paths through which light may be introduced into, or reflected out of, the optical head. Thus, in addition to introducing laser light through the bottom of the lensholder 44, laser light may be introduced from the side and directed through the lens 34 to the recording surface of the optical disc by the mirror 76. This feature is particularly advantageous in that it enables the overall height of the optical head to be reduced.

Advantageously, the polarities of the permanent magnets 20, 22 are arranged such that the magnetic fields produced by them will interact with both the focus and tracking coils to affect movement of the objective lensholder 44 in both the focus and tracking directions. This is accomplished by positioning the tracking coils 30, 32 such that their center axes are substantially collinear with the direction of magnetization of the permanent magnets 20, 22 and positioning the focus coils 26, 28 such that their axes are substantially perpendicular to the direction of magnetization of the permanent magnets.

Figure 6:
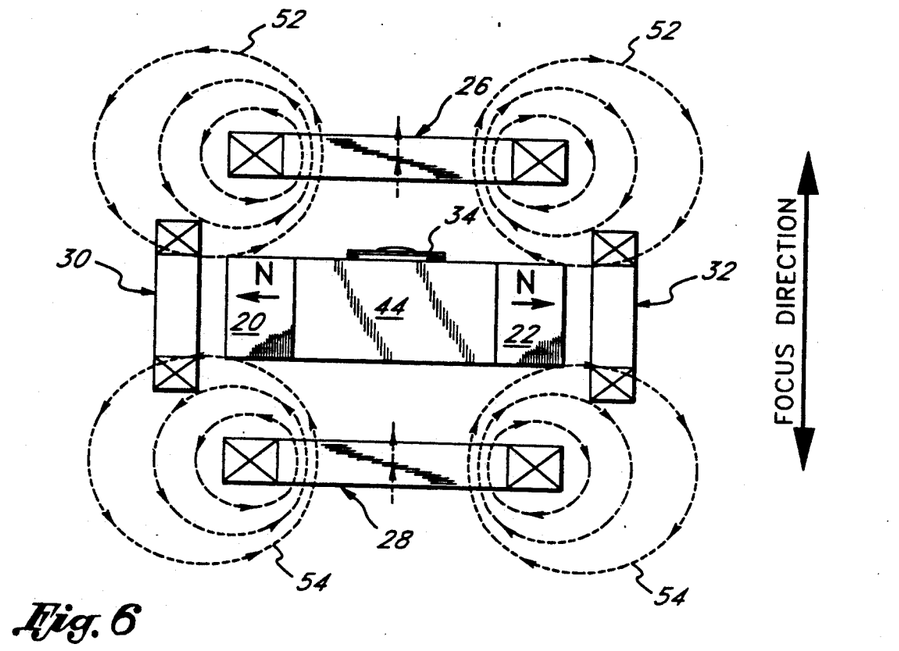
FIG. 6 is a schematic illustration of the interaction of the permanent magnets with the induced magnetic fields of the focus coils typical of both embodiments to effect movement in the focus direction.

As illustrated in FIG. 6, when the focus servo circuit (not shown) applies a driving current to the focus coils 26, 28, an induced electromagnetic field will be generated about each focus coil 26, 28. Exemplary magnetic field lines 52, 54 of the induced electromagnetic fields, as schematically illustrated, interact with the magnetic field of the permanent magnets 20, 22 to attract and repel the lensholder 44 along the focus direction, i.e., in an up-and-down manner. For example, if the polarities of the permanent magnets and the direction of the induced magnetic fields are present as indicated in FIG. 6, both magnets 20 and 22 will be attracted by focus coil 28 and repelled by focus coil 26, thus moving the objective lensholder 44 toward coil 28 and away from coil 26. Conversely, if the current is applied to the focus coils in the opposite direction, both magnets 20 and 22 will be repelled by focus coil 28 and attracted by focus coil 26, thus moving the objective lensholder 44 toward coil 26 and away from coil 28. The degree of movement of the lensholder 44 in the focus direction is dependent upon the strength of the induced magnetic field, which is controlled by the focus servo circuit.

Figure 7:
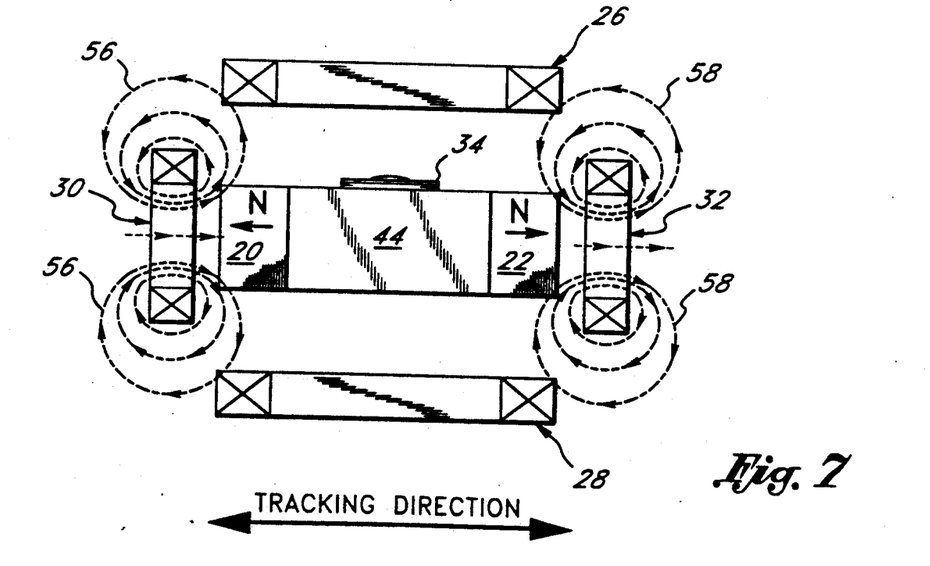
FIG. 7 is a schematic illustration of the interaction of the permanent magnets with the induced magnetic fields of the tracking coils for the actuator shown in FIG. 3, to effect radial movement of the objective lensholder.

In a similar manner, as schematically illustrated in FIG. 7, when the tracking servo circuit (not shown) applies a driving current to the tracking coils 30, 32 an induced electromagnetic field is generated about each of the tracking coils. Thus, if the induced magnetic field lines 56, 58 and the polarities of the permanent magnets 20, 22 are as schematically illustrated in FIG. 7, magnet 20 will be repelled by coil 30 and magnet 22 will be attracted by coil 32, thus moving the objective lensholder 44 toward coil 32 and away from coil 30. Conversely, if the current applied to the tracking coils 32, 30 is reversed, the objective lensholder 44 will be shifted to the left as tracking coil 30 will now attract magnet 20 and tracking coil 32 will repel magnet 22.

As shown in FIG. 3, a pair of flexures 60, 62 are provided to suspend the objective lensholder 44 within the base 24. Preferably, the upper flexure 60, is mounted to the base 24 at platform 66, intermediate sidewalls 68, 70. Similarly, although not shown in the drawings, the lower flexure 62 is also mounted to the base 24 in a like manner. The flexures 60, 62 act as parallel leaf springs which permit the objective lensholder 44 to move upand-down for focusing while prohibiting changes in the orientation of the axis of the lens 34. That is, the upper flexure 60 and lower flexure 62 move in a parallel relationship to one another such that the objective lens 34 will not be canted with respect to the optical disc as the lensholder 44 moves in the focus direction.

Each flexure 60, 62 also includes a narrow portion 72 which operates as a hinge to allow some movement of the objective lensholder 44 in a side-to-side direction (tracking direction) for tracking adjustments. Thus, when the actuator 12 is oriented as shown in the FIG. 3, movement of the objective lensholder 44, and thus the objective lens 34 in both a vertical direction (for focusing) and a horizontal direction (for tracking) may be accomplished.

Disposed beneath the lower flexure 62 is a mass balance 74. The mass balance 74 is provided as a counterweight so that the electromagnetic forces applied to effect movement of the objective lens 34 are applied at the center of gravity of the lensholder 44 to eliminate rotational forces on the lensholder 40 during acceleration in the tracking direction.

As schematically illustrated in FIG. 4, the present system allows the placement of a mirror 76 between the flexures 60, 62. Heretofore, only two faces of the objective lensholder 44 were available for conducting light into and out of the optical head. Thus, with previous systems, the laser light had to be introduced from beneath the objective lens 34. Preferably, the mirror 76 is oriented such that if incoming laser light 16 enters the optical head substantially perpendicular to the axis of the objective lens 34, the light will be reflected by the mirror 76, through the lens 34 and toward the disc (not shown). This may be accomplished by securing the mirror 76 to a rod (not shown). The rod may then be inserted through the bottom of the actuator 12 so that the mirror 76 is in the path of the incoming laser light 16. This is significant in that the mirror 76 allows light 16 emitted from a laser (not shown) to be introduced into the actuator 12 from the side of the optical head rather than from the bottom. This is advantageous in that it reduces the overall height of the optical head. Further, if it is desired to maintain a fixed relationship between the mirror 76 and the base 24, the rod may be removably secured to the base 24, so that it remains stationary with respect to the base 24.

In addition to accomplishing fine focusing and tracking movements of the objective lensholder 44, and thus the objective lens 34, it is often desirable to detect the position of the lensholder 44 with respect to the base 24. Such detection enables one to ascertain the positioning of the objective lens 34 with respect to the base 24 in both a tracking (sideways) and/or a focusing (up-and-down) direction. As illustrated in FIG. 3, a light emitting diode (LED) 78 is mounted within a first aperture 80 disposed within the base 24. A detector 82 is mounted on a laterally opposed side of the base 24, proximate a second aperture 84, which is in alignment with the first aperture 80. A pair of circular positioning apertures 48, 50 are situated on laterally opposed sides of the lensholder 44, in alignment with the detector 82 and the LED 78. Preferably, positioning aperture 48 is substantially smaller than positioning aperture 50. Thus, when the LED 78 is energized, substantially collimated light is emitted through the circular positioning apertures 48, 50 provided on opposite sides of the lensholder 44. Depending upon the position of the lensholder 44 with respect to the base 24, light emitted by the LED 78 will fall onto various portions of the detector 82.

Figure 9:
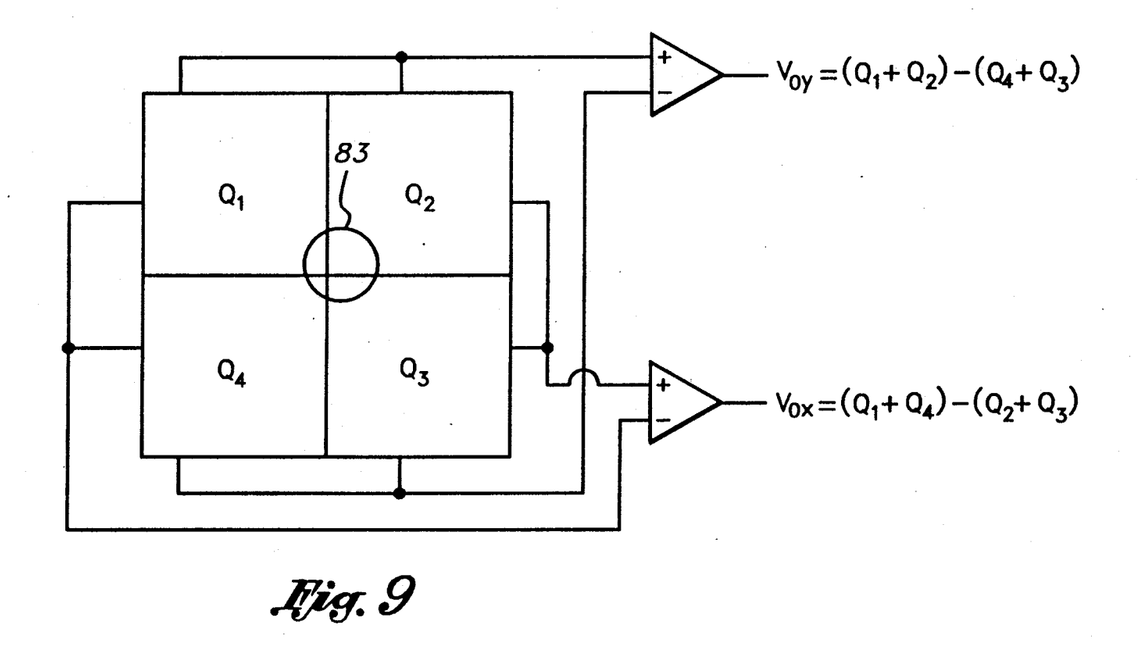
FIG. 9 is a schematic representation of a quad detector, suitable for use as a two-axis position detector.

FIG. 9 is a schematic representation of a quad diode, suitable for use as the detector 82. The quad detector 82 generates a signal proportional to the intensity of the incident light on each quadrant. Preferably, the quad diode is adjusted such that when the lensholder 44 is centered with respect to the base 24, each quadrant of the detector will receive substantially equal degree of illumination. Thus, the outputs of the detector, $V_{0x}$ and $V_{0y}$ will each be zero.

If, however, the lensholder 44 is off-centered with respect to the base 24, certain quadrants of the detector will receive a greater amount of light than others. This is schematically illustrated in FIG. 9, where light spot 83 is shown off-centered with respect to the center of the quad diode. As illustrated, the vertical positioning of the lensholder with respect to the base 24 may be ascertained by taking the difference of the sum of the voltages generated by the two upper quadrants ($Q_1+Q_2$) and the sum of the voltages generated by the two lower quadrants ($Q_4+Q_3$). Thus, the vertical positioning of the lensholder may be determined by the equation:

$$V_{0y}=(Q_1+Q_2)-(Q_4+Q_3).$$

Similarly, the horizontal positioning of the lensholder 44 with respect to the base 24 may be ascertained by taking the difference of the sum of the voltages generated by the two left quadrants ($Q_1+Q_4$) and the sum of the voltages generated by the two right quadrants ($Q_2+Q_3$). Thus, the horizontal disposition of the lensholder 44 with respect to the base 24 may be determined by the equation:

$$V_{0x}=(Q_1+Q_4)-(Q_2+Q_3).$$

Another type of detector, particularly suited as a detector for this type of application, could be for example, a position sensitive detector. A position sensitive detector is a light sensitive device which, when illuminated, generates a current proportional to the intensity of the light impingent thereon. Thus, the position of the lensholder 44 with respect to the base 24 could be determined simply by ascertaining the point at which the current or light intensity on the detector 82 was the greatest. Preferably, however, a two-way position sensitive detector is utilized so that the position of the lensholder 44 with respect to the base may be sensed in both the focus (i.e., up-and-down) and tracking (i.e., side-to-side) directions.

Figure 5:
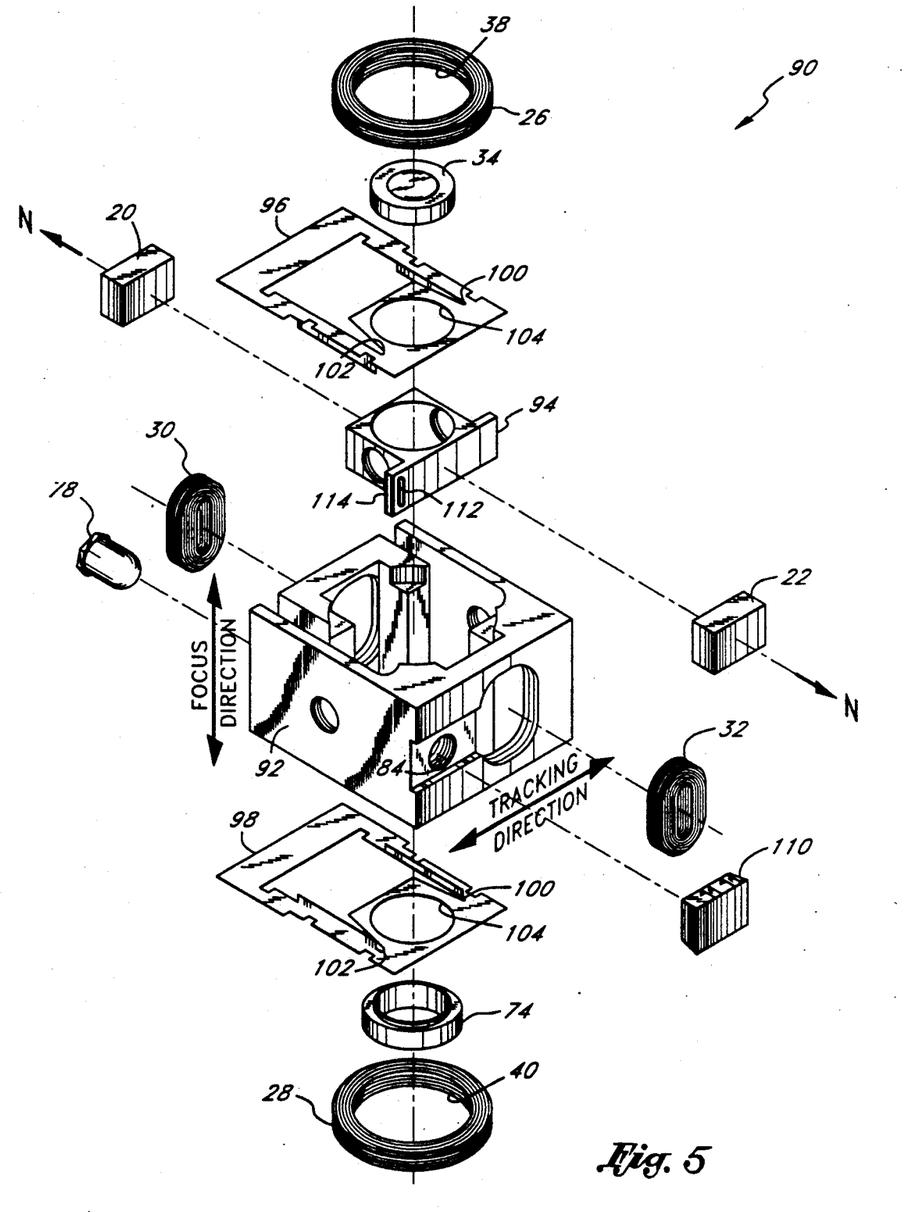
FIG. 5 is an exploded perspective view of an alternative embodiment of the two axis electromagnetic actuator of the present invention, in which the tracking coils are offset from the center of the permanent magnets.

FIG. 5 illustrates an alternative embodiment of a two-axis electromagnetic actuator 90, consistent with the present invention. In this embodiment, the actuator 90 again comprises a moving magnet configuration, and includes a base 92, having mounted thereon a pair of focus coils 26, 28 and a pair of tracking coils 30, 32. The focus and tracking coils, when energized, interact with the magnetic field of the permanent magnets 20, 22 so as to effect movement of the objective lens 34 along two orthogonal directions.

Preferably, the objective lens 34 sits atop an objective lensholder 94, and is suspended with respect to the base 92 by a pair of flexures 96, 98. The upper flexure 96 and the lower flexure 98 move in a parallel relationship to one another, like parallel leaf springs, and prohibit changes in the orientation of the axis of the lens 34.

Thus, as the flexures 96, 98 flex in an up-and-down direction, the objective lens 34 will not be canted with respect to the optical disc as the lensholder 94 is moved. Additionally, each flexure 96, 98 includes two hinge portions 100, 102, located on opposite sides of a circular aperture 104 which provides a path through which light may travel. The hinge portions 100, 102 allow movement of the objective in a side-to-side direction for tracking adjustment.

Secured to the lensholder 94, on laterally opposed sides, are a pair of permanent magnets 20, 22, polarized such that the north pole of each magnet faces away from the lensholder 94. The magnets 20, 22 work in conjunction with the induced electromagnetic fields set up in the focus coils 26, 28 in the same manner as they did in the first embodiment and as illustrated in FIG. 6. Accordingly, the focus coils 26, 28 are situated above and below the base 92, such that their center axes are substantially perpendicular to the direction of magnetization of the magnets 20, 22. In addition, the central apertures 38, 40 of the focus coils are positioned in substantial alignment with the center of the objective lens 34. The tracking coils 30, 32, however, are situated such that their central axes are offset from an axis which is collinear with the direction of magnetization of the permanent magnets 20, 22.

Figure 8:
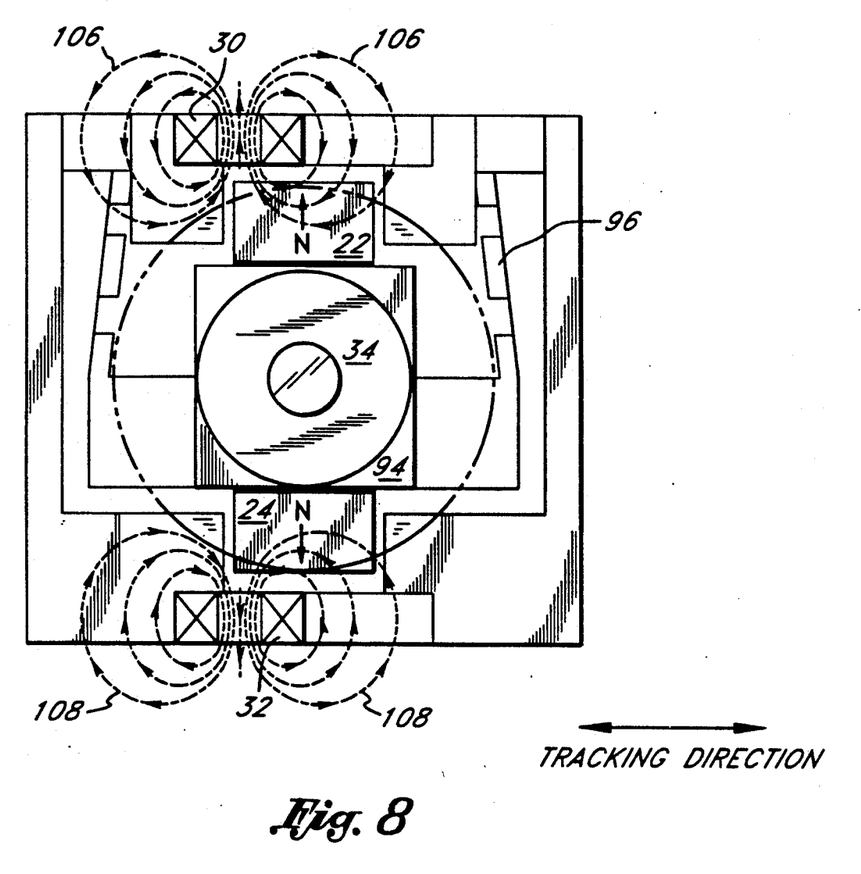
FIG. 8 is a schematic illustration of the interaction of the permanent magnets with the induced magnetic fields of the tracking coils for the actuator shown in FIG. 5, to effect radial movement of the objective lensholder.

FIG. 8 schematically illustrates exemplary magnetic field lines 106, 108 of the electromagnetic fields set up by the tracking coils 30, 32. If, for example, the polarities of the permanent magnets 20, 22 and the direction of the electromagnetic field lines 106, 108 are present as schematically illustrated in FIG. 8, both of the magnets 20, 22 will be repelled by the fields produced by the coils 30, 32, thus shifting the objective lens 34 to the left. If however, current is applied to the tracking coils in the opposite direction, the direction of the induced magnetic fields are reversed and the magnets will be attracted by the fields produced by the coils thereby shifting the objective 34 to the right. The magnitude and polarity of the driving current, derived from the tracking servo circuit (not shown), determine the amount and direction of movement the objective undergoes when the tracking coils are energized.

A mass balance 74 is provided as a counterweight so that the electromagnetic forces which effect movement of the objective lensholder 94 are applied as a moment about the center of gravity of the lensholder. This helps eliminate the rotational forces on the lensholder 94 during acceleration in the tracking direction.

The actuator 90, illustrated in FIG. 5, is also equipped with a positioning detector 110 for detecting the tracking position of the objective lens. Preferably, a flange 114 is provided on one side of the objective lensholder 94. The flange 114 exhibits a vertical slot 112. An LED 78 is mounted on one side of the base 92 and is positioned such that when the objective lensholder 94 is centered within the base 92, light emitted by the LED 78 will illuminate a predetermined portion of the detector 110.

In this instance, a split diode could be employed as the detector 82. If a split diode is used, the detector 82 should be positioned such that when the lensholder 44 is centered within the base 24, light emitted by the LED 78 will pass through apertures 48 and 50 and will be equally distributed on both halves of the detector 82. Thus, as the lensholder 94 moves in a side-to-side manner, i.e., the tracking direction, various portions of the detector 110 will be illuminated, indicative of the position of the lensholder 94 in the tracking or side-to-side direction, as viewed in FIGS. 5 and 8. Consequently, when the lensholder 44 is not centered with respect to the base 24, a portion of the light emitted from the LED 78 will be blocked by the lensholder 44, causing an unequal distribution of light on the two halves of the detector 82. This unequal distribution may be analyzed to determine the position of the lensholder 44 with respect to the base 24. It should be understood, however, that either form of position sensor may be utilized in either embodiment.

FIG. 4 schematically illustrates the ability to couple laser light with a mirror 76 positioned between the flexures 60, 62. As depicted in FIG. 4, when the device is in operation, laser light 16 is emitted from a laser (not shown), and is incident on the mirror 76. The light 16 is then brought into focus at 116 and imaged onto an optical disc (not shown) by the objective lens 34. If the reflected laser beam is imaged back onto itself, it is an indication that the laser spot is in focus on the disc. However, if the reflected beam is not imaged back onto itself, an error signal is generated and is utilized as input to the appropriate servo circuit (not shown). For example, if a focus error signal is generated, it is applied as input to a servo amplifier (not shown). The servo amplifier, in response to the focus error signal will then generate a current, which sets up an electromagnetic field in each of the focus coils 26, 28. The focus coils, in response to the electromagnetic fields will interact with the magnetic fields of the permanent magnets to move the objective lensholder in an up-and-down direction (as viewed in FIGS. 2, 3, 4, 5, 6 and 7) to focus the laser light upon the disc.

Similarly, if a tracking error signal is generated, it will be applied to a tracking servo circuit (not shown). The tracking servo circuit, in response to the tracking error signal, will generate a current which sets up an electromagnetic field in each of the tracking coils 30, 32. Depending upon the arrangement of the tracking coils 30, 32 with respect to the permanent magnets 20, 22 (see FIGS. 7 and 8), the objective lens 34 may be moved as previously described. If the coils 30, 32 are arranged such that their center axes are collinear with the magnetization of the central axis of the permanent magnets (FIG. 7), the objective lensholder 94 will be moved in a push-pull fashion. If, however, the coils 30, 32 are offset from the center of the central axis of the permanent magnets (FIG. 8), the lensholder 94 will be attracted toward, or repelled away from, the center of the magnets, in a side-to-side or tracking direction as viewed in FIG. 8.

It will be appreciated that certain structural variations may suggest themselves to those skilled in the art. The foregoing detailed description is to be clearly understood as given by way of illustration, the spirit and scope of this invention be limited solely by the appended claims.

What is claimed is:

1. An actuator, comprising:
   a base;
   an objective lensholder, movably mounted on said base;
   an objective lens mounted on said lensholder;
   a pair of permanent magnets, secured to said lensholder on laterally opposed sides, each of said pair of permanent magnets having a direction of magnetization;

a first coil, positioned on said base to create a first electromagnetic field which interacts with the magnetization of said permanent magnets to move said lensholder in a first direction relative to said base; and a second coil having a central axis, positioned on said base to create a second electromagnetic field which interacts with the magnetization of said permanent magnets to move said lensholder in a second direction relative to said base, substantially perpendicular to said first direction, wherein said central axis of said second coil is substantially perpendicular to each of said directions of magnetization of said pair of permanent magnets.

2. An actuator, as defined by claim 1, wherein said magnets are arranged such that said direction of magnetization of said magnets is collinear but opposite.

3. An actuator, as defined by claim 1, further comprising:
a pair of flexures, mounted to said base on laterally opposed sides, said flexures constructed and arranged to suspend said lensholder from said base.

4. An actuator, as defined by claim 3, wherein said flexures move in a parallel relationship to one another, to enable movement of said lensholder.

5. An actuator, as defined by claim 3, further comprising a mirror, positioned between said flexures.

6. An actuator, as defined by claim 5, wherein said mirror is oriented such that light entering said actuator is reflected by said mirror toward said objective lensholder, in a direction substantially perpendicular to the direction of said incident laser light.

7. An actuator, as defined by claim 5, wherein said mirror is secured to a rod which remains stationary with respect to said base.

8. An actuator, as defined by claim 1, wherein said base serves as a heat sink for said first and second coils.

9. An actuator, as defined by claim 1, wherein said lensholder comprises a plurality of vacant faces through which light may be conducted.

10. An actuator, as defined by claim 1, further comprising a positioning sensor.

11. An actuator, as defined by claim 10, wherein said positioning sensor comprises:
a detector, mounted to said base; and
a light emitting diode, mounted to said base, laterally opposed from said detector, said diode constructed and arranged to emit light through said lensholder and onto said detector, wherein the light impingent on said detector causes said detector to produce an output signal which is indicative of the positioning of said lensholder with respect to said base.

12. An actuator, as defined by claim 11, wherein said detector comprises a quad diode.

13. An actuator, as defined by claim 11, wherein said detector comprises a two-way position sensitive detector which detects the position of said lensholder in two directions.

14. An actuator, as defined by claim 10, wherein said lensholder further comprises a flange having a vertical slot, said slot positioned in alignment with said positioning sensor.

15. An actuator, as defined by claim 14, wherein said positioning sensor further comprises:
a detector, mounted to said base collinear with said vertical slot of said flange; and
a light emitting diode, mounted to said base, laterally opposed from said detector, said diode constructed and arranged to emit roughly collimated light through said vertical slot of said flange and onto said detector, wherein the amount and position of said collimated light on said detector is indicative of the positioning of said lensholder.

16. An actuator, as defined by claim 15, wherein said detector comprises a dual split diode.

17. An actuator, as defined by claim 15, wherein said detector comprises a position sensitive detector.

18. A two axis electromagnetic actuator, comprising:
a base;
a flexure, fixed to said base and movable with respect to said base;
a lensholder, mounted on said flexure;
an objective lens mounted on said lensholder defining an optical axis;
a permanent magnet having a direction of magnetization, secured to said lensholder;
a first coil, secured to said base, said first coil positioned to create a magnetic field which urges said permanent magnet and thus said lensholder to move in a first direction; and
a second coil having a central axis secured to said base, said second coil positioned to create a magnetic field which urges said permanent magnet and thus said lensholder to move in a second direction, different from said first direction collinear with said optical axis, said central axis of said second coil being substantially perpendicular to said direction of magnetization of said permanent magnet.

19. An actuator, as defined by claim 18, wherein said lensholder has at least four vacant faces through which light may be conducted.

20. An actuator, as defined by claim 18, further comprising a mirror, said mirror positioned within said lensholder, for reflecting incoming laser light.

21. An actuator, as defined by claim 20, wherein said mirror is oriented such that said laser light is reflected in a direction substantially perpendicular to the direction of said incoming laser light.

22. An actuator, as defined by claim 20, wherein said mirror is secured to a rod which remains stationary with respect to said base.

23. An actuator, as defined by claim 18, wherein said first coil has a central axis and is mounted to said base such that said central axis of said first coil is substantially collinear with said direction of magnetization of said magnet.

24. An actuator, as defined by claim 18, wherein first coil has a central axis and is mounted on said base such that said central axis of said first coil is offset from the center of magnetization of said magnet.

25. A two axis electromagnetic actuator, comprising:
a base;
an objective lensholder, movably mounted on said base;
a pair of permanent magnets, secured to said lensholder on laterally opposed sides, each of said permanent magnets having a direction of magnetization;
a first pair of coils, secured to said base on laterally opposed sides, each of said first pair of coils having a central axis which is substantially collinear with the direction of magnetization of said permanent magnets; and
a second pair of coils, secured to said base on laterally opposed sides, each of said second pair of coils having a central axis which is substantially perpendicular to the direction of magnetization of said permanent magnets.

26. A two axis electromagnetic actuator, as defined by claim 25, wherein said central axes of said first pair of coils are offset from the center of magnetization of said permanent magnets.

27. A two axis electromagnetic actuator, as defined by claim 25, further comprising:
a pair of flexures, mounted to said base on laterally opposed sides, said flexures constructed and arranged to suspend said lensholder within said base and enable movement of said lensholder relative to said base.

28. A two axis electromagnetic actuator, as defined by claim 27, further comprising a mirror, positioned between said flexures.

29. A two axis electromagnetic actuator, as defined by claim 28, wherein said mirror is oriented such that light entering said actuator is reflected by said mirror, toward said objective lensholder, in a direction substantially perpendicular to the direction of said light.

30. A two axis electromagnetic actuator, as defined by claim 28, wherein said mirror is secured to a rod which remains stationary with respect to said base.

31. A two axis electromagnetic actuator, as defined by claim 25, wherein said base serves as a heat sink for said coils.

32. A two axis electromagnetic actuator, as defined by claim 25, further comprising a positioning sensor.

33. A two axis electromagnetic actuator, as defined by claim 26, wherein said objective lensholder has at least four vacant faces through which light may be conducted.

34. A two axis actuator alignment system, comprising:
an objective lens defining an optical axis;
a movable component on which said objective lens is mounted, said movable component having a first aperture through which light may be transmitted and a second aperture, substantially in alignment with said first aperture, such alignment of said first aperture and said second aperture being transverse to said optical axis;
a base, said base being stationary with respect to said movable component;
a light source, mounted to said base, said light source capable of emitting light toward said apertures disposed within said movable component; and
a light sensitive detector, mounted to said base on a side laterally opposed from said light source, said detector responsive to light transmitted through said apertures in said movable component, said detector constructed and arranged to generate an output signal which is indicative of the position of said movable component with respect to said base in two axial directions.

35. A positional detection system, as defined by claim 34, wherein said detector comprises a position sensitive detector.

36. positional detection system, as defined by claim 34, wherein said detector comprises a quad diode.

37. A two axis electromagnetic actuator, comprising:
a base;
an objective lensholder, movably mounted on said base;
first and second permanent magnets, secured to said lensholder on laterally opposed sides, each of said permanent magnets having a center of magnetization which corresponds to a north pole facing away from said lensholder, said north poles of said permanent magnets being coaxial;
a first focus coil secured to said base, above said lensholder, said first coil having a central axis substantially perpendicular to said center of magnetization of said permanent magnets;
a second focus coil secured to said base, laterally opposed from said first focus coil, said second focus coil having a central axis coaxial with said central axis of said first focus coil, said first and second coils constructed and arranged to attract and repel said permanent magnets along a focus direction when energized;
a first tracking coil secured to said base, adjacent said first permanent magnet, said first tracking coil having a central axis which is substantially collinear with said center of magnetization of said permanent magnets; and
a second tracking coil secured to said base, adjacent said second permanent magnet and laterally opposed from said first tracking coil, said second tracking coil having a central axis which is substantially coaxial with said central axis of said first tracking coil, said first and second tracking coils constructed and arranged to attract and repel said permanent magnets along a tracking direction when energized.

38. A two axis electromagnetic actuator, as defined by claim 37, wherein said first and second tracking coils are mounted to said base such that their center axes are coaxial with said center of magnetization of said permanent magnets.

39. A two axis electromagnetic actuator, as defined by claim 37, wherein said first and second tracking coils are mounted to said base such that their central axes are offset from said center of magnetization of said permanent magnets.

* * * * *